May 4, 1965

B. C. COAD 3,181,935

LOW-MELTING POINT MATERIALS AND METHOD
OF THEIR MANUFACTURE

Filed March 21, 1960

INVENTOR.
BRIAN C. COAD
BY
*Harold Levine*
ATTY.

United States Patent Office 3,181,935
Patented May 4, 1965

3,181,935
LOW-MELTING POINT MATERIALS AND
METHOD OF THEIR MANUFACTURE
Brian C. Coad, Attleboro, Mass., assignor to Texas Instruments Incorporated, Dallas, Tex., a corporation of Delaware
Filed Mar. 21, 1960, Ser. No. 16,517
12 Claims. (Cl. 29—183.5)

This invention relates generally to improved low-melting point materials and to a method of their manufacture, and more particularly to low-melting point composite materials.

Among the several objects of the invention may be noted the provision of composite materials having components adapted to be alloyed and simultaneously form low-melting point brazed or soldered joints between parts to be connected; the provision of composite materials of the class described which, although formed of components subject to embrittlement when alloyed, are nevertheless substantially malleable in the composite state at various composite thicknesses including very thin gauges, i.e., on the order of 0.002" in thickness preceding alloying by firing to solder or braze; and the provision of materials of the class described which by a convenient and low-cost but accurate method of manufacture can be produced in very thin final gauges in forms for nonbreakable transportation, and conversion thereafter by forming, punching, bending and the like into shapes desirable for soldering and brazing at predictable low-melting point temperatures. Other objects and features will be in part apparent and in part pointed out hereinafter.

The invention accordingly comprises the combinations of components, the proportions thereof, steps and sequence of steps, and features of compositions and manipulation, which will be exemplified in the products and methods hereinafter described, and the scope of which will be indicated in the following claims.

In the accompanying drawings, in which one of various possible embodiments of the invention is illustrated:

Corresponding reference characters indicate corresponding parts throughout the several views of the drawings.

Figure 1:
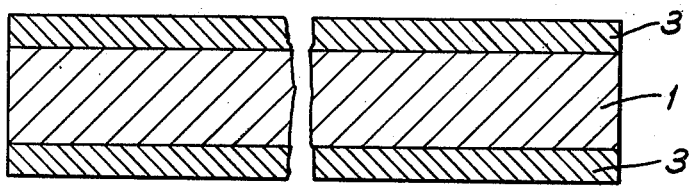
FIG. 1 is a diagram illustrating a first step of my new process for forming my new product.

The instant invention is an improvement over that disclosed and claimed in a copending application of Thomas E. McGinn, entitled "Low-Melting Point Materials and Method of Their Manufacture," application Serial No. 15,938, filed on March 18, 1960, and assigned to the assignee of the instant invention. The present invention, in its more specific aspects, relates particularly to low-melting point alloys of gold and tin which, when in the form of an adhered or physically bonded nonalloyed assembly, are substantially malleable, and when in alloy form are brittle.

It has been found that in providing nonalloyed adhered assemblies of gold and tin in accordance with the invention as described and claimed in the copending application referred to above, that certain problems arise with very thin layers of tin or with very thin gauges of the composite adhered product. The tin component is very soft and ductile and because of substantial stretch-off when this component is being adhered to the gold component, problems of guiding and quantity control arise. These problems are further accentuated with very thin layers of tin, i.e., on the order of 0.005" to 0.030" in thickness. For guiding purposes, it is necessary to apply tension to the tin layer which is being fed for adherence to the gold layer by roll bonding in accordance with the methods described in the aforementioned copending application. The necessity for applying tension to the tin layer also further accentuates the stretch-off problems of this relatively soft layer.

It has also been found that certain problems arise in providing the nonalloyed gold-tin composite at very thin finish gauges, i.e., on the order of 0.005" or less in thickness. At very thin gauges, with some conventional rolling mills, there may be a tendency for the composite product to break apart or fail in tension as the product is being reduced in thickness to the very thin gauges mentioned above.

The general purpose of the present invention is to provide certain additives to either the gold-tin components or both which will improve the components and tend to obviate or at least minimize the problems described above when the two components are physically bonded to provide a nonalloyed malleable assembly of brittle forming alloy components in a proportion adapted, upon firing in situ for brazing or soldering, to form a low-melting point alloy as the firing proceeds, whereby the product before firing does not partake of the brittle characteristics of the resulting alloy, in the manner described in the aforesaid copending application.

The term low-melting point alloy, as it is applicable to the materials to which the invention relates, is defined herein as one having its components in such proportions by weight that the melting point is lower than that of the component having the higher melting point and may or may not be less than that of the component having the lower melting point. Such low melting point may, for example, be the eutectic temperature for a given system of alloys. It will be understood by those skilled in the art that metallurgical phase diagrams are commonly available in the literature for determining the various melting temperatures resulting from various component weight ratios which make up a given alloy, for the practice of the instant invention.

As more fully discussed in the aforesaid copending application, among low-melting point alloys useful for low-temperature brazing or soldering are some which are non-malleable, i.e., brittle and liable to crack and break, especially in thin layers, thus considerably reducing their usefulness as brazing or soldering products in sheet, ribbon, or other forms, although embrittlement after soldering or brazing operations may be of no consequence to their function as a joint between the parts joined thereby. Gold-tin, as described in the copending application, is an example of such low-melting point alloys. Specifically, fine gold and substantially pure tin, above mentioned for example, will produce a brittle alloy when mixed by weight in the proportion of 80 gold to 20 tin and also in other low-melting point proportions within the definition of a low-melting point alloy above given, but at the thin gauges described above, will also have the fabrication problems also described above.

An example of the invention is illustrated in the drawings. Referring to FIG. 1, a block, sheet, strip or the like 1 of gold is provided on opposite faces with tin cladding blocks, sheets, strips or the like 3, preferably of substantially equal interfacial areas. The ratio of total thicknesses of the intermediate gold 1 and tin cladding 3 are chosen for example to provide a low-melting point weight ratio of fine gold to pure tin of approximately 80:20. Their absolute thicknesses are not critical, being such as to provide an ultimate desirable area of composite material after reduction in thickness, to be described.

Figure 2:
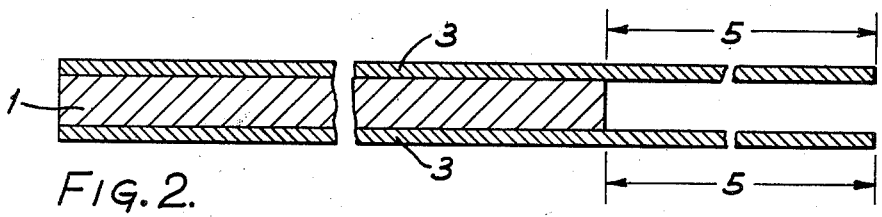
FIG. 2 is a diagram illustrating a second step.

The assembly such as shown in FIG. 1 is made after the faces to be contacted of the pieces 1 and 3 have as a preliminary step been suitably cleaned, as by wire brushing and heating or the equivalent, to remove bond-deterrent materials. Various means may then be employed for joining or adhereing the layers 1 and 3, as for example by a solid-phase bond. This may be accomplished, for example, by rolling under pressure produced by a suitable reduction in thickness of the assembly 1, 3, as disclosed in U.S. Patent 2,691,815 or 2,753,623. A one-pass reduction of 50% to 60% or so in thickness of the assembly has been found sufficient although more may be used to establish a solid-phase bond which holds the sheets together as a composite malleable sheet or strip, considerably enlarged in area over that of the assembly shown in FIG. 1. A substantial amount of stretch-off may also occur in connection with the softer tin material 3, as illustrated at 5 in FIG. 2.

Figure 3:
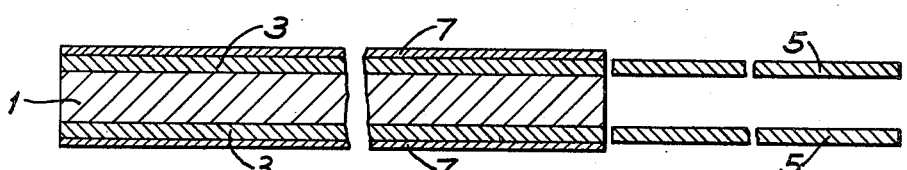
FIG. 3 is a diagram illustrating a third step.

Next the stretch-off 5 is severed, as illustrated in FIG. 3. This removed material is weighed. Then two additional sheets or ribbons 7 of tin are applied as shown in FIG. 3, totalling the same weight as that of the removed stretch-off material, each sheet being of an area substantially the same as an outside face area of the bonded assembly 1, 3. This occurs after the interfaces of materials 3 and 7 have been cleaned in the manner above described in connection with FIG. 1. In order to establish said equality to the weight of the removed stretch-off material 5, the sheets or ribbons 7 are of appropriate thicknesses. The purpose of this is to maintain in the assembly 1, 3, 7 the original weight ratio of gold to tin of approximately 80:20.

Figure 4:
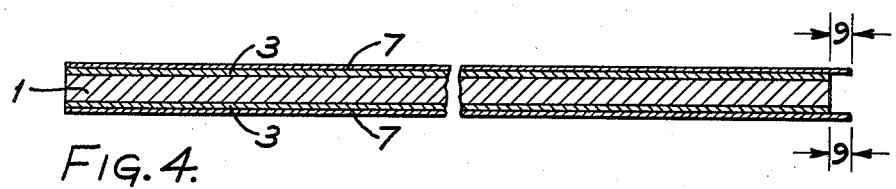
FIG. 4 is a diagram illustrating a fourth step and also illustrating the new product.

Further reduction of, for example, 25% or so by rolling is then carried out to solid-phase bond sheets 7 to sheets 3 with a result which may be as shown in FIG. 4, which indicates some but less stretch-off 9. This again is cut off. If the stretch-off 9 at this stage is appreciable, it again may be weighed and replaced on assembly 1, 3, 7 (after cleaning) by amounts of tin sheets or ribbons as above described, with subsequent rolling and bonding of the assembly with the replaced material. However, at this FIG. 4 stage the repetition of replacement of stretch-off material may become unnecessary, because of the inconsequential loss of tin upon the second reduction. In any event, at some stage of repetition of the process, replacement of removed stretch-off material will become unnecessary because the amount of stretch-off ultimately becomes so small as by its absence only negligibly to affect the desired final approximate 80:20 weight ratio of the bonded gold and tin. Thus it will be seen that the gold-tin weight ratio at the end of the process is substantially the same as at the beginning, i.e., 80:20 or thereabout. Finally, the material after the solid-phase bonding has been completed in the manner above described may be finish-rolled to a thinness of a few thousandths of an inch or less, as for example by a 10%–12% finishing reduction. While such a final thickness is desirable, as will appear, it is not critical.

It will be understood that the ratios of thicknesses of the layers 3, 1, 3 in FIG. 1 are not in a direct proportion to the desired weight ratios of these layers because the densities of tin and gold are different, and therefore the weights per unit of areas of these materials are not in proportion to their thicknesses.

It will be recognized from a phase diagram for gold and tin that 80:20 is a low melting point ratio for gold and tin if alloyed. Thus the melting point of gold is 1063° C.; that of tin is 232° C.; and that of any 80:20 alloy that may be formed therefrom will be 280° C., the eutectic temperature, which comes within the definition of a low-melting point alloy as given above. It is to be understood, however, that other gold-tin weight ratios may be employed which would produce, if alloyed, a low-melting point material in the sense that such an alloy would melt at a temperature different from the eutectic temperature but lower than the melting temperature of the gold and would be a low melting point alloy within the definition thereof, as given above. However, approximately an 80:20 weight ratio is preferable because it provides a gold-rich combination which when alloyed is desirable, and which provides a eutectic, which has a congruent or isothermal melting point, which eutectic melting point is also conveniently low.

It is pointed out that a final product such as illustrated in FIG. 4, consisting of a central layer of gold clad on its opposite faces with the tin, is not in and of itself an 80:20 gold-tin alloy but simply a material capable of becoming one if suitably heated. Its advantage is that the multilayer composite material is not brittle but of malleable form which may be coiled, stamped, formed, et cetera. Thus it may be shipped without breakage and cut up into appropriately stamped and formed pieces for insertion between parts to be brazed or soldered. When so inserted, it is fired, i.e., heated to a temperature in excess of the melting temperature of tin but below the melting temperature of gold. Thus the tin melts and progressively dissolves the gold without melting it in the usual sense of the term melt but alloys with it. The brazing or soldering temperature should be selected to be somewhat in excess of the final melting temperature of the resultant alloy to insure complete alloying, if a condition of dissolution of all of the gold to form the 80:20 alloy is to be reached. The resulting 80:20 alloy has a melting point of 280° C. which is also the eutectic temperature. The resultant alloy formed at the temperature in excess of 280° C., upon cooling below 280° C., solidifies to hold together the pieces being brazed or soldered. At this stage, the solidified 80:20 gold-tin alloy may be brittle but this is inconsequential to its holding function. It will be apparent that the brazed or soldered joint may be separated at a melting temperature of 280° C.

Attention is called to the fact that other methods than solid-phase bonding may be employed for joining the layers 1 and 3, as, for example, by processes involving the production at the interfaces between bonded faces of some small amounts of brittle intermetallic compounds. Such processes are satisfactory, provided the formation of any brittle intermetallic compounds between the faces of the components is maintained below an amount which would deleteriously affect the working properties of the strip material such as shown in FIG. 4, before having the final firing heat applied thereto for conversion to an alloy in the soldering or brazing operation.

The present invention contemplates the addition of additives individually to one or both of the gold and tin components so as to stiffen the components and substantially increase their tensile strength. During the adhering or bonding process, wherein thin tin layers 3 are to be adhered or bonded to a gold layer 1 and the soft tin strip is difficult to handle and presents stretch-off problems, these problems can be overcome by adding up to 10% gold to the tin layer. The relatively small amount of gold which is added to the tin layer tends to stiffen the tin layer, increase its tensile strength and to minimize stretch-off and guiding problems. It should be understood that when employing such a tin layer, which contains a small but effective amount of gold effective to increase the tensile strength of the tin up to 10% gold, that the relative thicknesses of layers 1 and 3 will be adjusted so as to effect the desired final approximate weight ratio of the bonded tin and gold, which may for example be an 80:20 weight ratio which is also the eutectic.

Where a third component (i.e., other than gold or tin) is desirable or preferable, for example, for a doping function in transistor applications, which third constituent may comprise antimony or indium, such third constituents may be added to the tin layer for substantially the same purpose as the small addition of gold to the tin layer described above. The addition of antimony and indium may each be in an amount from a small but effective amount effective to increase tensile strength and reduce stretch-off characteristics, up to 10% weight. A 2% by weight of antimony or a 5% by weight of indium for the tin layer is preferred for its doping properties where the material is to be used in a transistor application. Thus the tin layer may comprise 98% tin, and 2% antimony, or 95% tin and 5% indium. It is again pointed out that the relative thicknesses of the tin and the gold would be adjusted so as to provide the desired final approximate weight ratio of bonded gold and tin. For example, where an 80:20 weight ratio of gold to tin has the substantially pure tin component replaced by a 98 tin:2 antimony layer, the weight ratio of gold to tin of the composite product in either nonalloyed or alloyed form would be 80:19.6 and 0.4 for the antimony. Such a weight ratio would provide a low-melting point alloy which is at or substantially near the eutectic within the above given definition of a low-melting point alloy. Below is a Table A indicating relative changes in properties, namely; diamond pyramid hardness and tensile strength in pounds per square inch for a tin component having varying additions of gold ranging from 0% to 4.9% by weight.

*Table A*

| Percent Gold Added to Tin Layer | Diamond Pyramid Hardness | Tensile Strength, p.s.i. |
| --- | --- | --- |
| 0 | 6.4 | 2,900 |
| 1.03 | 15 | 4,300 |
| 3.07 | 17 | 5,200 |
| 4.9 | 18 | 6,200 |

Where the composite product in its nonalloyed form, i.e., approximately 80:20 gold to tin weight ratio is to be rolled to very thin finish gauges, i.e., on the order of 0.005″ in thickness and less, and tensile failure and cracking problems are experienced during reduction rolling with conventional rolling mills, it has been discovered that these problems may be obviated or at least minimized by initially adding a small but effective amount of tin to the gold layer, i.e., on the order of up to 2% tin, will considerably increase the tensile strength of the composite product in its nonalloyed form without substantially deleteriously affecting the ductility and workable properties of the layer. It has also been found that if the tin addition to the gold-rich layer exceeds 3% by weight of tin, that the resultant layer has considerably reduced ductility and becomes brittle making reduction rolling and working of the component difficult. It has been found that at a finish thickness of 0.002″ in thickness in an approximately 80:20 gold to tin ratio, a substantially pure tin double clad fine gold product had a tensile strength of approximately 33,300 p.s.i. and that a 99% by weight gold, 1% by weight tin layer double clad with a 95% by weight tin, 5% by weight gold layer provided a composite product at the 0.002″ thickness which had a tensile strength of 60,500 p.s.i. Thus it can be seen that the tensile strength of the composite product at 0.002″ in thickness can be almost doubled by including the minor percentages of gold and tin to the respective tin-rich and gold-rich components 3 and 1, as shown in FIG. 1 and the problem of tension control in thin gauge rolling and that of cracking and tensile failure can be substantially reduced.

It should be understood that improved results according to the instant invention can be obtained by employing either the improved tin component with substantially fine gold, by employing both the improved tin and gold components or by employing the improved gold component with substantially pure tin.

Where a third component such as antimony or indium is desired or is preferred, it is preferable to add this third constituent (i.e., 2% antimony or 5% indium) to the tin-rich component rather than to the gold-rich component because it is advantageous to increase the hardness and tensile strength of the tin-rich component so that it will more nearly approach the greater hardness and tensile strength of the gold-rich layer. This also serves to provide an intrinsically harder product (i.e., approximately an 80:20 weight ratio of gold to tin) in the nonalloyed form with increased tensile strength properties.

In the above example, a ratio by weight of approximately 80:19.6 of gold to tin and 0.4 antimony was employed. If the ratios of gold to tin had been, for example, approximately 82:18 or 78:22 (without considering the minor antimony example), the melting point temperature at the soldering or brazing stage might have required increase on the order of about 50° but such alloys under the above definition will still be classed as low-melting point alloys. The significance of the selected 80:20 gold-tin ratio is (1) its desirable composition as a brazing or soldering material and (2) the comparatively low-melting temperature required to carry through the alloying during the brazing or soldering process.

It is to be understood that the term "metals" as used herein is intended to also include alloys thereof.

The above-mentioned thin characteristics of the final product, i.e., a few thousandths of an inch or so in thickness, are desirable primarily from the viewpoint of (1) providing a product which may be coiled for shipment and which is more conformable to surfaces to be joined when located in soldering position therebetween and hence also better able to wet them as melting proceeds, thereby resulting in a stronger attachment; and (2) a product which will be transformed into the alloy in a short period of heating during the brazing or soldering step. If greater thicknesses of the product are selected, correspondingly greater times of firing will be needed during the brazing or soldering step in order to complete the alloying process and therefore of course also to complete the brazing and soldering process to the 80:20 weight ratio.

While the invention as described may best be carried out by cladding both sides of one component with the other, the same method may be carried out by cladding on one side only or by analogously cladding other than flat shapes according to the invention. However, the two-faced cladding arrangement is preferred, since initial melting is accompanied by initial wetting on both adjacent faces of pieces to be joined, thus facilitating the making of an attachment.

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in a limiting sense.

I claim:

1. A low-melting point composite product useful for brazing, soldering and the like, comprising adhered components of gold and tin, the weight ratio of said gold or tin being such as to provide a eutectic when said product is alloyed upon suitable heating, and at least one of said gold and tin components including a minor constituent effective to increase the tensile strength of said one component.

2. A low-melting point composite product useful for brazing, soldering and the like, comprising adhered components of gold and tin, alloys of which are brittle, the weight ratio of said gold or tin being such as to provide a eutectic when said product is alloyed upon suitable heating, said gold component including a small but effective amount of tin effective to increase the tensile strength of said gold component without substantially deleteriously affecting the ductility thereof up to an amount of 3% by weight of said gold component.

3. A low-melting point composite product according to claim 1, wherein the composite thickness of said product is on the order of five-thousandths of an inch or less.

4. The low-melting point composite product according to claim 1, wherein said components are solid-phase bonded.

5. A low-melting point composite product as set forth in claim 1, wherein said tin component comprises at least two sheets and said gold component comprises at least one sheet, and said tin sheets cladding both sides of said gold sheet.

6. A low-melting point composite product useful for brazing, soldering and the like, comprising adhered components of gold and tin, alloys of which are brittle, the weight ratio of the gold to tin being such as to provide a eutectic when said product is alloyed upon suitable heating, said tin component itself including an amount of gold up to 10% by weight of said tin component, said amount of gold being effective to increase the tensile strength of said tin component.

7. A low-melting point composite product useful for brazing, soldering and the like, comprising adhered components of gold and tin, alloys of which are brittle, the weight ratio of gold to tin being such as to provide a eutectic when said product is alloyed upon suitable heating, said tin component itself including an amount of antimony up to 10% by weight of said tin component, said amount of antimony being effective to increase the tensile strength of said tin component.

8. A low-melting point composite product useful for brazing, soldering and the like, comprising adhered components of gold and tin, alloys of which are brittle, the weight ratio of gold to tin being such as to provide a eutectic when said product is alloyed upon suitable heating, said tin component itself including an amount of indium up to 10% by weight of said tin component, said amount of indium being effective to increase the tensile strength of said tin component.

9. A low-melting point composite product useful for brazing, soldering and the like, comprising adhered components of gold and tin, alloys of which are brittle, the adhered gold and tin components bearing such a thickness relationship to one another that upon heating an alloy of approximate eutectic composition is produced, said gold component itself including an amount of tin up to 2% by weight of said gold, said amount of tin being effective to increase the tensile strength of said gold component without substantially deleteriously affecting the ductility thereof; said tin component itself including an amount of gold up to 10% by weight of said tin component, said amount of gold being effective to increase the tensile strength of said tin component.

10. A low-melting point composite product according to claim 9 wherein the composite thickness of said product is on the order of .005" or less.

11. A low-melting point composite product according to claim 9 wherein said components are solid-phase bonded.

12. A low-melting point composite product as set forth in claim 9, wherein said tin component comprises at least two sheets aand said gold component comprises at least one sheet, said tin sheets cladding both sides of said gold sheet.

References Cited by the Examiner

UNITED STATES PATENTS

| | | | |
|---|---|---|---|
| 1,008,970 | 11/11 | Kessler | 29—199 |
| 1,089,773 | 3/14 | Kraus | 75—175.5 |
| 2,243,979 | 1/41 | Reynolds | 29—527 |
| 2,503,564 | 4/50 | Reeve | 29—199 |
| 2,691,815 | 10/50 | Boessenkool | 29—497.5 |
| 2,687,565 | 8/54 | Schaefer | 29—527 |
| 2,753,623 | 7/56 | Boessenkool | 29—497.5 |
| 2,824,359 | 2/58 | Rhodes | 29—194 |
| 2,834,098 | 5/58 | Pease | 29—194 |
| 2,959,501 | 11/60 | Schink | 148—33 X |
| 3,031,747 | 5/62 | Green | 29—199 |

OTHER REFERENCES

"Constitution of Binary Alloys," by Hansen, published by McGraw-Hill Book Company, New York, 1958, pp. 232–234.

DAVID L. RECK, *Primary Examiner.*

WHITMORE A. WILTZ, HYLAND BIZOT, *Examiners.*